(12) United States Patent
Kato et al.

(10) Patent No.: US 8,876,095 B2
(45) Date of Patent: Nov. 4, 2014

(54) COIL SPRING

(75) Inventors: Nobuharu Kato, Nagano (JP); Hirotaka Yamada, Nagano (JP); Jinetsu Kano, Nagano (JP); Takeshi Yabushita, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 52 days.

(21) Appl. No.: 13/388,247

(22) PCT Filed: Apr. 26, 2010

(86) PCT No.: PCT/JP2010/002994
§ 371 (c)(1),
(2), (4) Date: Apr. 10, 2012

(87) PCT Pub. No.: WO2011/013278
PCT Pub. Date: Feb. 3, 2011

(65) Prior Publication Data
US 2012/0193848 A1    Aug. 2, 2012

(30) Foreign Application Priority Data
Jul. 31, 2009    (JP) ................................. 2009-179621

(51) Int. Cl.
*F16F 1/06*    (2006.01)
*F16F 1/04*    (2006.01)
(52) U.S. Cl.
CPC .. *F16F 1/042* (2013.01); *F16F 1/04* (2013.01)
USPC ........................................................ 267/167
(58) Field of Classification Search
CPC .................................... F16F 1/04; F16F 1/042
USPC .................................................. 267/166–167
See application file for complete search history.

(56) References Cited

U.S. PATENT DOCUMENTS

| 5,823,035 | A | 10/1998 | Albers et al. |
| 2008/0171622 | A1 | 7/2008 | Schever |
| 2010/0090384 | A1 | 4/2010 | Fenioux et al. |

FOREIGN PATENT DOCUMENTS

| DE | 20 2008 014 807 | | 6/2009 |
| EP | 0 914 881 | | 5/1999 |
| EP | 1120582 | A1 * | 8/2001 |
| EP | 1 191 246 | | 3/2002 |
| JP | 6-300065 | | 10/1994 |
| WO | WO-2008/090748 | | 7/2008 |

* cited by examiner

*Primary Examiner* — Anna Momper
(74) *Attorney, Agent, or Firm* — Jordan and Hamburg LLP (57) ABSTRACT

A coil spring has a spring wire that is wound in a coil shape and whose sectional outer basic shape is circular and flat faces are formed between coil inner and outer diameter sections of a sectional outer shape of the spring wire, wherein a flattening T/W of the sectional outer shape with the flat faces in the coil axis direction is set so that a stress ratio is equal to or lower than a stress ratio of a coil spring whose sectional outer shape is circular.

13 Claims, 7 Drawing Sheets

No collapsing

Fig.10 (b)

Collapsing

Fig.11

COIL SPRING

BACKGROUND OF THE INVENTION

1. Field of the Invention

The present invention relates to a coil spring used as a torsion spring for a torsion damper, a valve spring, a return spring, a suspension spring, a die spring, or the like.

2. Description of Related Art

Among torsion springs and the like that are used for, for example, clutch disks, there is one that has a spring wire wound in a coil shape and having flat faces formed on a outer shape of a circular cross section thereof, the flat faces serving as contact faces.

When load is applied to the coil spring to press the coil shape into a tightly compressed state or a locked state, the flat faces of adjacent coil portions come into contact with each other to stably receive the load and suppress slippage in a coil diameter direction.

In general, stress on an inner diameter side (coil inner diameter section) of the coil shape of the spring wire of the coil spring is higher than that on an outer diameter side (coil outer diameter section) of the same. In addition, forming the flat faces results in changing a sectional flattening and affecting, together with the stress deviation, a stress distribution state of the spring wire in a sectional circumferential direction.

The spring wire that is provided with the flat faces may reduce a flattening of the sectional shape thereof, to shorten a solid length in a coil axis direction when the flat faces are brought into contact with each other. This configuration is advantageous when designing a spring having a long stroke and low rigidity.

Accordingly, determining a sectional flattening for a spring wire is important in realizing a coil spring having a good stress distribution and better design.

A conventionally suggested flattening is 0.85 to 0.98.

This flattening range, however, has limits when designing a coil spring better than a coil spring whose sectional outer shape is circular, and therefore, further improvements are required.

Patent Document 1: Japanese Unexamined Patent Application Publication No. H06-300065

SUMMARY OF INVENTION

A problem to be solved by the invention is that there are limits when designing a coil spring better than the coil spring whose sectional outer shape is circular.

To realize a coil spring of better design than a coil spring whose sectional outer basic shape is circular, the present invention provides a coil spring having a spring wire that is wound in a coil shape and whose sectional outer basic shape is circular and a contact face formed between coil inner and outer diameter sections of a sectional outer shape of the spring wire so that coil portions adjacent to each other in a coil axis direction are stabilized when they are brought into contact with each other through the contact face. A flattening T/W of the sectional outer shape with the contact faces in the coil axis direction is set so that a stress ratio is equal to or lower than a stress ratio of a coil spring whose sectional outer shape is circular.

In a coil spring having a spring wire that is wound in a coil shape and whose sectional outer basic shape is circular, the present invention the contact face formed between the coil inner and outer diameter sections of the sectional outer shape of the spring wire so that coil portions adjacent to each other in the coil axis direction are stabilized when they are brought into contact with each other through the contact face. The flattening T/W of the sectional outer shape with the contact faces in the coil axis direction is set so that the stress ratio is equal to or lower than a stress ratio of a coil spring whose sectional outer shape is circular.

This decreases stress equal to or lower than that on a circular cross section having no flat faces and realizes better design.

BRIEF DESCRIPTION OF DRAWINGS

FIGS. 7(a), (b) and (c) are graphs illustrating a relationship between flattening and solid height ratio, in which (a) is with D/W=3, (b) is with D/W=5, and (c) is with D/W=7 (First embodiment);

DETAILED DESCRIPTION OF EMBODIMENTS

The objects of improving a stress distribution state and realizing better design are realized by setting a flattening T/W in a coil axis direction of a sectional outer shape of a coil spring with contact faces to 0.83 to 0.32.

[Coil Spring (Torsion Spring)]

Figure 1:
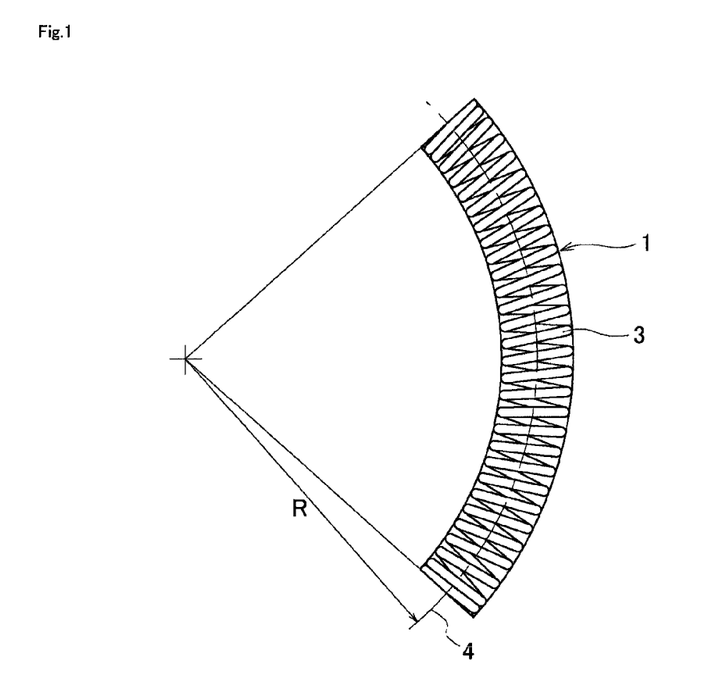
FIG. 1 is a front view of a coil spring (First embodiment)
Figure 2:
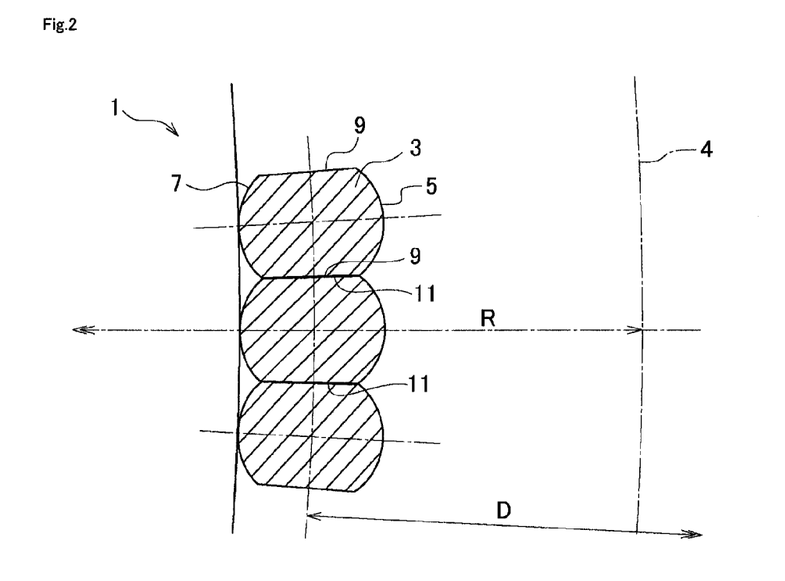
FIG. 2 is an enlarged sectional view of a relevant part on an inner diameter side of a coil shape (First embodiment)
Figure 3:
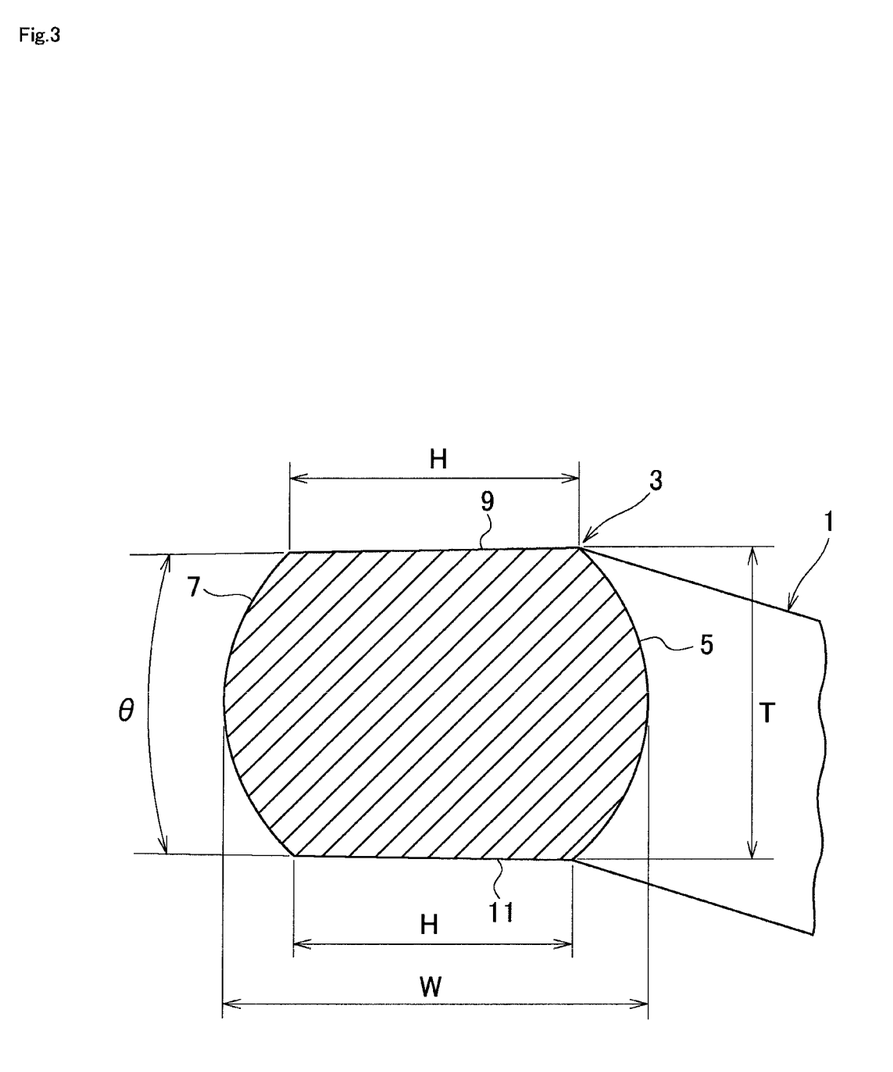
FIG. 3 is an enlarged sectional view of a spring wire (First embodiment)

FIG. 1 is a front view of a coil spring according to the first embodiment of the present invention, FIG. 2 is an enlarged sectional view illustrating a relevant part of a coil shape inner diameter side, and FIG. 3 is an enlarged sectional view of a spring wire.

The coil spring 1 of FIG. 1 is a torsion spring installed in, for example, a dual mass flywheel, a torque converter lockup, or a torsion damper (torsional vibration damper) of a friction disk for (designed for) a wet or dry clutch mechanism. The spring wire 3 is wound in a coil shape. The coil spring 1 has a coil axis 4 that is a circular arc in a free state. This circular arc shape has a curvature radius R in an assembled state.

The coil shape formed by the spring wire 3 may have a coil axis that, in a free state, is linear or any other than the assembled shape having the curvature radius R so that the spring wire 3 may form, when assembled, the circular shape having the curvature As illustrated in FIGS. 2 and 3, the spring wire 3 of the coil spring 1 has a circular sectional outer basic shape. Between a circular coil inner diameter section 5 and a circular coil outer diameter section 7 of a sectional outer shape of the spring wire 3, there are formed flat faces 9 and 11 serving as contact faces.

The coil inner diameter section 5 and coil outer diameter section 7 form part of the circular sectional outer basic shape.

The flat faces 9 and 11 are the formed contact faces that allow coil portions adjacent to each other in the direction of the coil axis 4 to come into contact with each other and get stabilized. According to this embodiment, the flat faces 9 and 11 are formed on both sides in the coil axis 4, respectively.

As illustrated in FIG. 2, the flat faces 9 and 11 are formed substantially along a direction aligned with a curvature radius of the coil axis 4 and are inclined toward a curvature center of the coil shape so that the sectional shape of the spring wire 3 has a wedge shape.

As illustrated in FIG. 3, a width H of the flat faces 9 and 11 is dependent on a flattening T/W. According to the embodiment, the sectional outer shape with the flat faces 9 and 11 has a flattening T/W of 0.76 in the direction of coil axis 4.

In addition, "T" is a maximum thickness dimension of the coil inner diameter section 5 in the direction of the coil axis 4 and "W" is a diameter of the sectional outer basic shape of the spring wire 3. Instead, "T" may be a thickness of the coil outer diameter section or an average thickness of the coil inner and outer diameter sections 5 and 7.

According to the settings of the flattening T/W and inclination, the flat faces 9 and 11 have an inter-angle θ and the coil inner diameter section 5 is semicircular with the maximum thickness dimension T. The inter-angle θ is centered at the curvature center of the coil spring 1.

(Stress Distribution)

Figure 4:
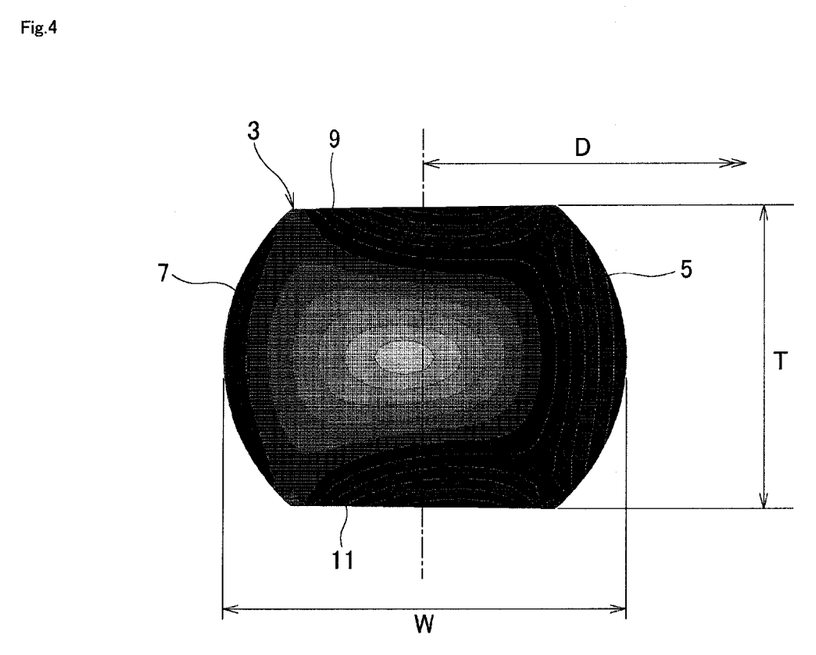
FIG. 4 is an explanatory view illustrating an analysis result of stress distribution state by finite element method (First embodiment)
Figure 5:
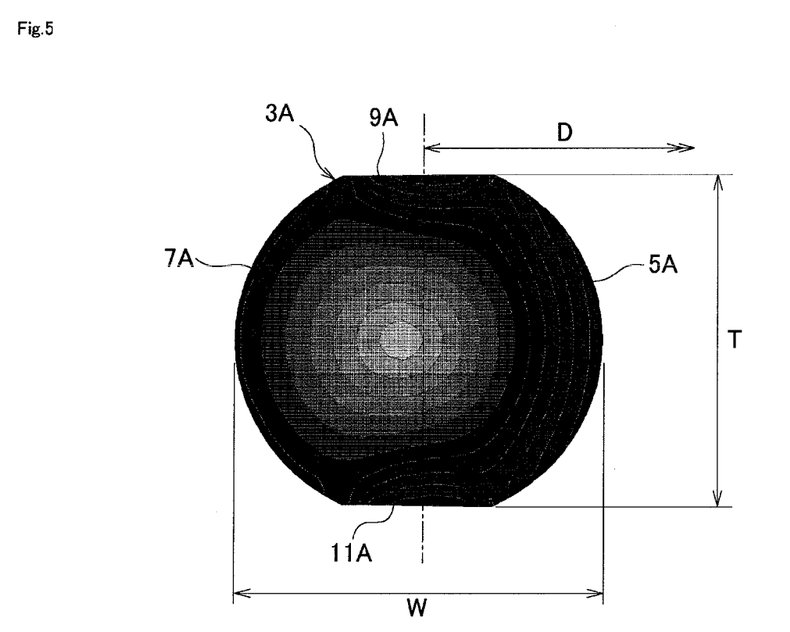
FIG. 5 is an explanatory view illustrating an analysis result of stress distribution state by finite element method (Comparative example)

FIGS. 4 and 5 are explanatory views illustrating analysis results of stress distribution states by finite element method, in which FIG. 4 is of the embodiment and FIG. 5 is of a comparative example. In FIG. 5, a part corresponding to that of FIG. 4 is represented with the same reference mark plus "A".

As illustrated in FIG. 4, the spring wire 3 that is provided with the flat faces 9 and 11 and flattening T/W=0.76 can continuously distribute stress on the coil inner diameter section 5 up to the coil outer diameter section 7. As is apparent from comparison with an example of FIG. 11, the embodiment of FIG. 4 has the properly selected flattening and continuously, surely, and uniformly distributes stress between the coil inner and outer diameter sections 5 and 7. On the other hand, the comparative example of FIG. 5 with a flattening T/W=0.92 demonstrates a limit on continuous and uniform distribution of stress between the coil inner and outer diameter sections 5A and 7A compared with the embodiment.

(Flattening and Stress Ratio)

Figure 6:
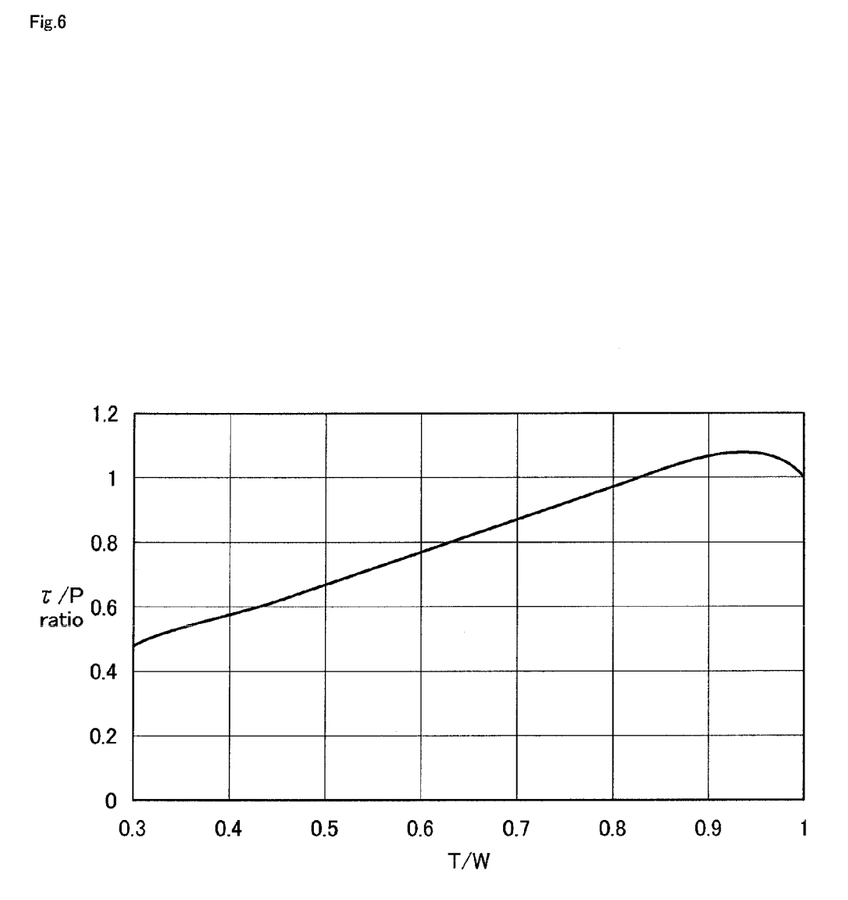
FIG. 6 is a graph illustrating a relationship between flattening and stress ratio (First embodiment)

FIG. 6 is a graph illustrating a relationship between flattening and stress ratio. In FIG. 6, a solid height Hs is fixed to 25 and a change in the stress ratio is examined with respect to a change in the flattening T/W.

A stress ratio τ/P of a circular cross section without flat faces is set to 1. In addition, "τ" is a maximum shearing stress at a coil innermost circumference and "P" is load applied to the coil.

As illustrated in FIG. 6, the flattening T/W of 0.83 or lower makes the stress ratio τ/P equal to or lower than 1, i.e., equal to or lower than that of the circular cross section without flat faces, to realize better design.

(Coil Slippage)

In a torsion spring of a vehicle, a coil may slip in a coil diameter direction when the spring receives load that may press the spring into a tightly compressed state or over. To prevent this, the torsion spring is provided with a flat face on one or both sides of a wire cross section in a coil axis direction.

The related arts consider that, if a base sectional shape is circular, a larger flattening is advantageous in terms of stress, and therefore, specify the flattening to be 0.98 to 0.85. According to our analytic examinations, it is found that a smaller flattening is advantageous in terms of coil spring designing.

(Effect of First Embodiment)

According to the embodiment, the coil spring 1 has the spring wire 3 that is wound in a coil shape and whose sectional outer basic shape is circular. Between the coil inner and outer diameter sections 5 and 7 of the sectional outer shape of the spring wire 3, the flat faces 9 and 11 are formed so that coil portions adjacent to each other in the direction of the coil axis 4 are stabilized when they are brought into contact with each other through the flat faces 9 and 11. The flattening T/W in the coil axis direction of the sectional outer shape with the flat faces 9 and 11 is set so that the stress ratio is equal to or lower than a stress ratio of a coil spring whose sectional outer shape is circular.

This reduces stress to a level equal to or lower than that of a coil spring with a circular cross section having no flat faces and realizes better design.

The flat faces 9 and 11 stably receive load and shorten a solid length in a tightly compressed state. This is advantageous when designing a spring having a longer stroke and lower rigidity. At the same time, this provides a better stress distribution in a circumferential direction of the sectional outer shape and improves the uniformity of stress distribution.

Namely, the embodiment easily secures a sufficient quality when designing a torsion spring having a long stroke and low rigidity.

The flat faces 9 and 11 are formed in the direction of the coil axis 4 on both sides of the sectional shape of the spring wire 3 respectively, to surely receive load in the direction of the coil axis 4 when the coil is in a tightly compressed state, thereby surely suppressing slippage in a coil diameter direction.

The coil axis 4 of the coil shape is the circular arc and the flat faces 9 and 11 are formed substantially along the direction aligned with the curvature radius of the coil axis 4. Even if the coil axis 4 is the circular arc, load in the direction of the coil axis 4 is surely received to surely suppress slippage in the coil diameter direction.

When the coil axis 4 is the circular arc in a free state, the coil shape of the spring wire 3 allows the coil axis 4 to be easily installed in the circular arc shape. Additionally, the flat faces 9 and 11 are easily set according to the circular arc shape of the coil axis 4.

The coil axis 4 of the coil shape formed by the spring wire 3 may be, in a free state, linear or any other than the assembled shape having the curvature radius R, so that the spring wire 3 may form, when assembled, the circular arc shape having the curvature radius R. In this case, the coil axis 4 before assembling may be made linear or nearly linear. This realizes easy parts management.

The coil spring 1 is installed in, for example, a dual mass flywheel, a torque converter lockup, or a torsion damper (torsional vibration damper) of a friction disk for (designed for) a wet or dry clutch mechanism. It is easy for the coil spring 1 to have a long stroke and low rigidity.

This easily improves the dynamic filtering function required for a torsion damper (torsional vibration damper) installed in an engine system to attenuate sound and vibration.

The contact faces are not limited to the perfect flat faces 9 and 11. They may be slight convex or concave faces. The contact faces may be slightly convex on one side of the coil axis 4 of the spring wire 3 and slightly concave on the other side.

Inclinations of the flat faces 9 and 11 may slightly deflect from the direction aligned with the curvature radius R of the circular arc shape of the coil axis 4.

[Coil Spring General]

The above-mentioned matters not limited to the torsion spring, such as forming the flat faces and setting the flattening T/W to realize a stress ratio equal to or lower than a stress ratio of a coil spring whose sectional outer shape is circular, are generally applicable to coil springs. The coil springs may provide the coil springs with the effect of reducing stress lower than that of a circular cross section having no flat faces, as well as the effect of realizing better design.

The matters are also applicable to coil springs whose coil axis 4 is linear. In this case, the flat faces 9 and 11 may be formed substantially orthogonal to the coil axis.

The followings will be mentioned for coil springs in general.

(Solid Height Ratio)

Figure 7:
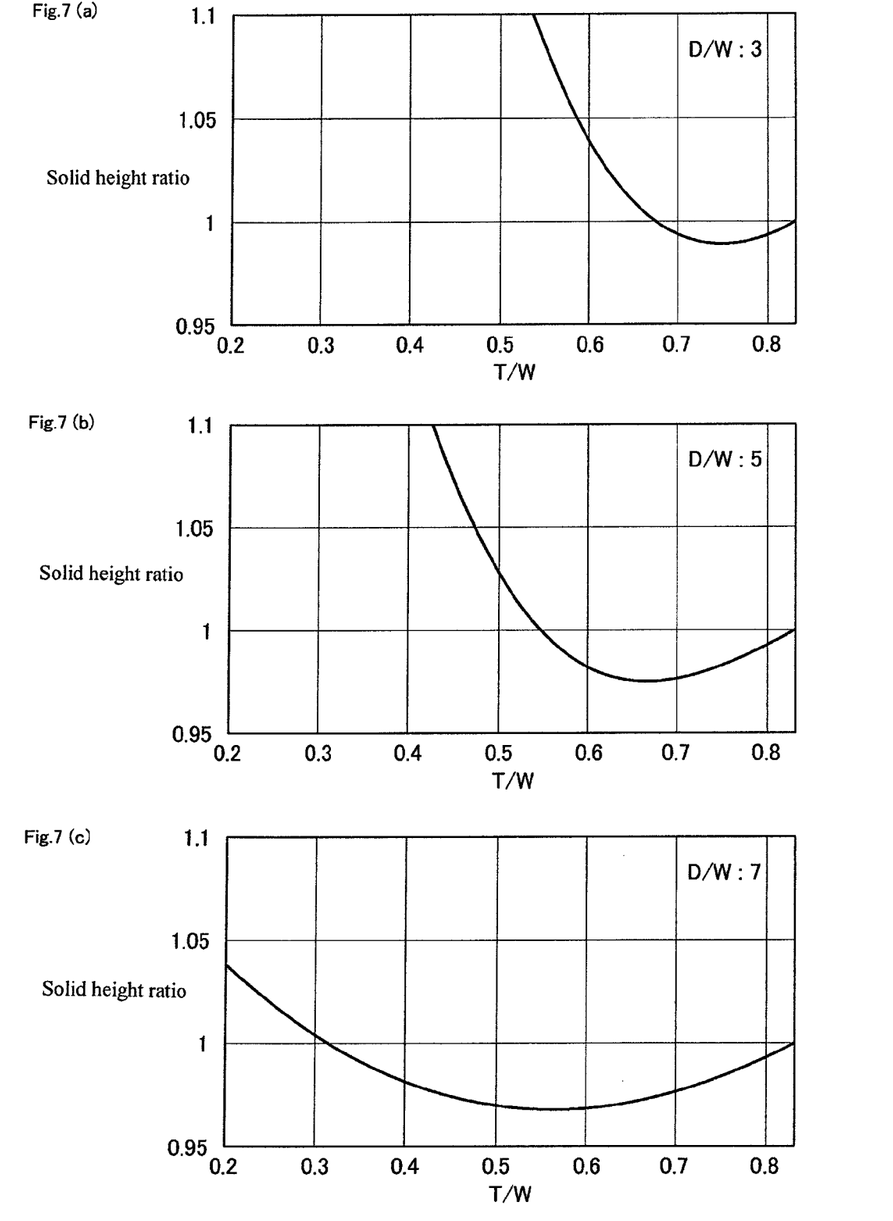

FIGS. 7(*a*), (*b*), and (*c*) are graphs illustrating relationships between flattening and solid height ratio according to the embodiment. In FIGS. 7(*a*), (*b*), and (*c*), a stress ratio τ/P is fixed and a spring index D/W is changed among 3, 5, and 7.

As illustrated in FIGS. 7(*a*), (*b*), and (*c*), each of the spring indexes D/W=3, 5, and 7 can reduce the stress and solid height of the coil springs of various specifications if the flattening T/W is 0.32 or over.

(Bearing Surface Without Abrasive Process)

The sectional outer basic shape of the spring wire 3 is circular, and on the basis of this sectional shape, the flat face 9 serves as a bearing surface on each side in the coil axis direction.

The flat face 9 is prepared at each coil end when the coil spring 1 is formed such that the flat face is substantially orthogonal to the coil axis to form the bearing surface. Accordingly, there is no need of bearing surface abrasive process.

At this time, a flattening is selected according to the specifications of the coil spring 1, to realize design equal to or better than that of the conventional circular-section coil spring.

Figure 8:
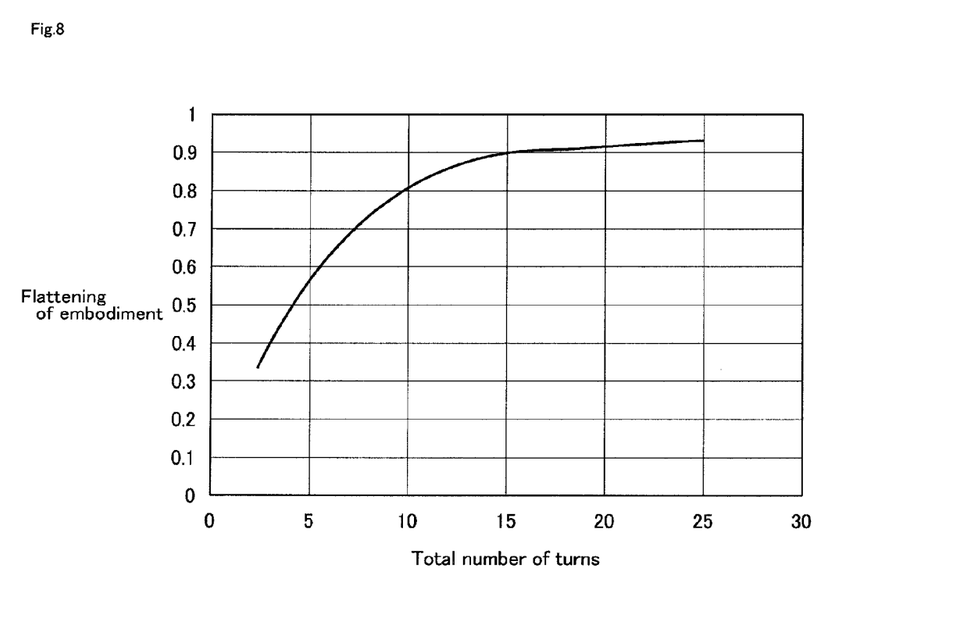
FIG. 8 is a graph illustrating a relationship between flattening and stress ratio (First embodiment)

FIG. 8 illustrates a relationship between the total number of coil turns and wire section flattening of coil springs that involve no abrasive process and realize the same solid height as a normal coil spring having a circular cross section and involving the abrasive process. In FIG. 8, a coil diameter, spring constant, and stress ratio τ/P are fixed.

In a region below (smaller flattening) a line illustrated in FIG. 8, it is possible to realize a design equal to or better than the conventional circular section design. This line is expressed as follows:

$$Y=-0.0000023837 \times X^4 + 0.0002456386 \times X^3 - 0.0090929958 \times X + 0.147730555 \times X + 0.0180485763$$

where "X" is the total number of turns and "Y" is the flattening.

A return spring for AT or CVT of a vehicle, a torsion spring for a torsion damper, or a valve spring for an engine has a relatively thick wire diameter, a relatively large coil diameter, and heavy operating load, and therefore, the total number of coil turns thereof is approximately 11.2 or smaller. Since the wire diameter is thick and the coil diameter is large, the effect of eliminating the abrasive process is great in reducing processing time and abrasive amount.

Accordingly, a spring having a total number of turns of 11.2 or smaller may employ a wire sectional shape with a flattening below the above-mentioned line, to eliminate the abrasive process and realize a capability equal to or better than that of the conventional circular-section spring.

(Bearing Surface Abrasive Amount Reduction)

Abrasive process may be executed while a flattening is selected to reduce an abrasive margin smaller than that of the related art, to make a design equal to or better than the conventional circular-section design with reducing a processing time and abrasive amount.

Generally, a coil spring needs an abrasive amount of 0.75 turns, to stabilize the coil spring in use. This may be reduced to 0.5 turns or smaller, to reduce the processing time and abrasive amount according to the embodiment.

Figure 9:
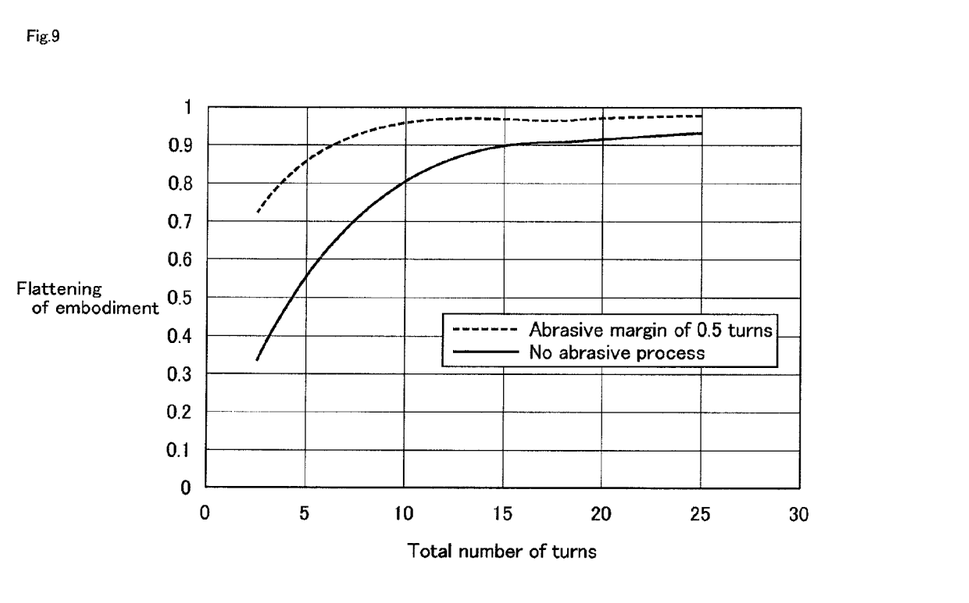
FIG. 9 is a graph illustrating a relationship between flattening and solid height ratio (First embodiment)

FIG. 9 illustrates a relationship between the total number of coil turns and wire section flattening of coil springs that involve a bearing surface abrasive margin of 0.5 turns and realize the same solid height as a normal coil spring having a circular cross section and involving the abrasive process. In FIG. 9, a coil inner diameter, spring constant, and stress ratio τ/P are fixed.

In a region below (smaller flattening) a line illustrated in FIG. 9, it is possible to realize a design equal to or better than the conventional circular section design. This line is expressed as follows:

$$Y=-0.0000065161 \times X^4 + 0.0004455905 \times X^3 - 0.0110490116 \times X^2 + 0.1189494097 \times X + 0.4928257777$$

where "X" is the total number of turns and "Y" is the flattening.

(Collapse at Coiling)

Figure 10:
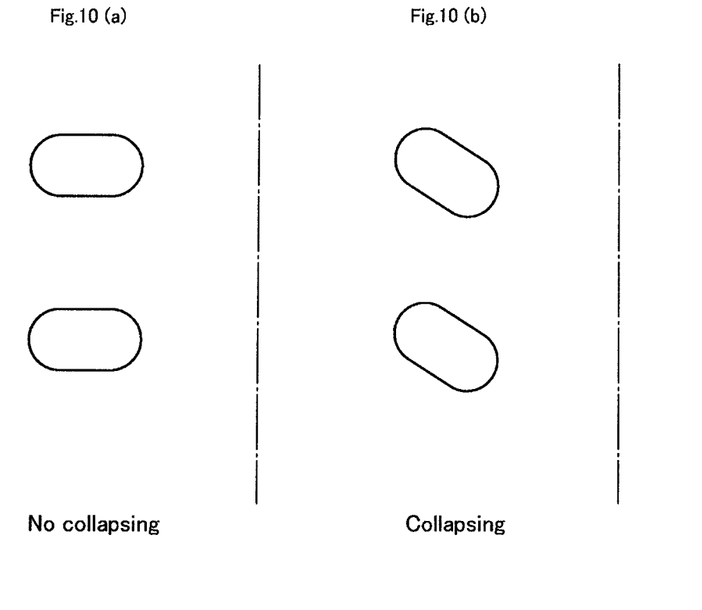
FIGS. 10(a) and 10(b) are sectional views partly illustrating a coil spring having flat faces, in which (a) is without collapse and (b) is with collapse (First embodiment)
Figure 11:
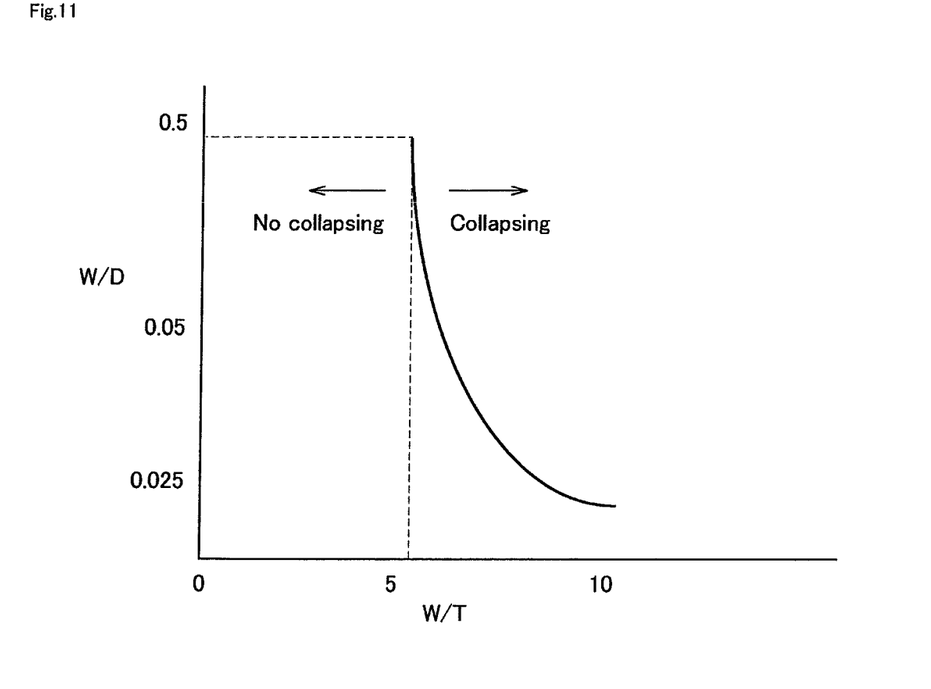
FIG. 11 is a graph illustrating the occurrence of collapse (First embodiment).

FIG. 10 is a partial sectional view illustrating a coil spring having flat faces, in which FIG. 10(*a*) is without collapse and FIG. 10(*b*) is with collapse. FIG. 11 is a graph illustrating an occurrence of collapse.

When a wire material having a flattened cross section is coiled like FIG. 10(*a*), the coil sometimes collapses like FIG. 10(*b*). The collapse increases the solid height and stress of the coil spring and deteriorates the design superiority of the flattened cross section, and therefore, it is preferable not to cause the collapse.

The collapse at coiling has the following relationships:

Small T/W→Large collapse

Small D/W→Large collapse

Large guide clearance→Large collapse

Collapse at a proper guide clearance of 0.1 mm is examined on a solid model by FEM analysis (coiling simulation). As a result, as illustrated in FIG. 11, no collapse occurs if W/D<=0.5 (D/W>=2) and W/T<=5 (T/W>=0.2).

Namely, according to the embodiment of the present invention, the coil spring 1 has the spring wire 3 that is wound in a coil shape and whose sectional outer basic shape is circular. Between the coil inner and outer diameter sections 5 and 7 of the sectional outer shape of the spring wire 3, the flat faces 9 and 11 are formed so that the coil portions adjacent to each other in the direction of the coil axis 4 are stabilized when they are brought into contact with each other through the contact faces 9 and 11. The flattening T/W in the coil axis direction of the sectional outer shape with the flat faces 9 and 11 is set in the range of 0.2<=T/W<=0.83.

(Bearing Surface Grinding)

An end of a coil spring is ground to form a bearing surface to stabilize the spring in use. For this, an abrasive process is needed. This process takes a time and affects an environment because it produces abrasive sludge. This is particularly serious when the coil spring has a thick wire and a large coil diameter.

In connection with this, the embodiment has the flat face 9 on each side of a wire material section, to realize the same or better performance than the related art while eliminating the abrasive process or reducing a processing time and abrasive margin. This also reduces costs and protects an environment by reducing abrasive sludge.

[Valve Spring]

Matters applicable to a valve spring are those not limited to the torsion spring among the above-mentioned matters, such as forming the flat faces and setting the flattening T/W that realizes a stress ratio equal to or lower than that of a coil spring having a circular sectional outer shape and those mentioned in connection with the coil spring general. In addition, the following must be mentioned:

(First Turn Breakage)

An end and a first turn of a valve spring includes wire-to-wire contact parts that cause a high contact stress due to contact pressure, as well as causing the peeling of a reinforced layer on a wire surface formed by shot peening. This results in causing a fatigue breakage starting from a high contact pressure part between wires.

The embodiment of the present invention forms the flat faces to increase a wire-to-wire contact area and reduce the contact pressure and abrasion, thereby hardly causing the first turn breakage.

(Surging Reduction)

The valve spring causes a resonant phenomenon, i.e., surging in actual use, to increase stress and decrease durability. To suppress the surging, absorbing surge energy by contact and separation between wires is considered to be effective.

The embodiment of the present invention increases a contact area between wires. This is expected to increase energy to be absorbed and suppress the surging.

(Engine Head Downsizing)

A valve spring reduces a solid height by 10% or more if it is provided with a best-mode flattening according to the embodiment. This results in lowering the height of an engine head, lightening an engine, and reducing fuel consumption.

[AT Return Spring]

Matters applicable to an AT return spring are those not limited to the torsion spring among the above-mentioned matters, such as forming the flat faces and setting the flattening T/W that realizes a stress ratio equal to or lower than that of a coil spring having a circular sectional outer shape and those mentioned in connection with the coil spring general. In addition, the following must be mentioned:

The AT return spring has a limited space in a coil axis direction. Accordingly, the number of turns thereof must be reduced. This raises a problem that a load eccentricity occurs to obliquely push a piston and cause friction.

The embodiment of the present invention can decrease a solid height to increase the number of turns, to hardly cause the load eccentricity.

The invention claimed is:

1. A coil spring comprising:
 a spring wire that is wound in a coil shape and whose sectional outer basic shape is circular; and
 a contact face formed between coil inner and outer diameter sections of a sectional outer shape of the spring wire so that coil portions adjacent to each other in a coil axis direction are stabilized when they are brought into contact with each other through the contact face, the sectional outer shape being of the spring wire having the contact face based on the sectional outer basic shape,
 wherein a flattening of the sectional outer shape with the contact face in the coil axis direction corresponds to a stress ratio that is equal to or lower than a stress ratio of a coil spring whose sectional outer shape is circular, in which "T" and "W" are opposite elements resulting in an inverse relationship, and "T/W" represents the flattening and the flattening is in a range of $0.32 \leq T/W \leq 0.83$, and
 wherein the coil spring includes one of either no bearing surface formed by a bearing surface abrasive process or a reduced bearing surface formed by the bearing surface abrasive process to have a reduced abrasive amount, the reduced abrasive amount required to form said bearing surface being equivalent to a reference normal bearing surface formed on a reference normal coil spring having a circular cross section by the bearing surface abrasive process with a reference abrasive amount, the reference abrasive amount being greater than the reduced abrasive amount,
 wherein the coil shape has a total number of coil turns that is determined according to the flattening of the sectional outer shape in a region below a line of a relationship, the relationship appearing in a state where a coil inner diameter, spring constant, and stress ratio are fixed, between a total number of coil turns and the flattening of the sectional outer shape in the coil spring for which no bearing surface is formed by the bearing surface of the abrasive process or for which the bearing surface is formed by the bearing surface abrasive process with the reduced abrasive amount, said line of the relationship defined so that the coil spring includes no bearing surface or the bearing surface formed by the bearing surface abrasive process has the same solid height as the reference normal coil spring when the coil spring and reference normal coil spring have the total number of coil turns and the flattening on the line of the relationship, the region below the line of the relationship defined so that the flattening in the region is less than the flattening on the line at each total number of coil turns.

2. The coil spring as set forth in claim 1 wherein the contact face is a flat face.

3. The coil spring as set forth in claim 1 wherein the contact face is arranged on each side of the sectional outer shape of the spring wire in the coil axis direction.

4. The coil spring as set forth in claim 1 wherein the coil axis of the coil shape is linear and the contact face is formed substantially orthogonally to the coil axis.

5. The coil spring as set forth in claim 1 wherein the coil axis of the coil shape is a circular arc and the contact face is substantially formed along a direction aligned with a curvature radius of the coil axis.

6. The coil spring as set forth in claim 5 wherein the coil shape of the spring wire is so set that the coil axis is the circular arc in a free state.

7. The coil spring as set forth in claim 5 wherein the coil shape of the spring wire is so set that, in a free state, the coil axis is linear or any whose curvature radius differs from an assembled-state curvature radius, and when assembled, becomes the circular arc having the assembled-state curvature radius.

8. The coil spring of claim 1, wherein the coil has a total number (Y) of coil turns as follows:

$$Y=-0.0000023837 \times X^4+0.0002456386 \times X^3-0.0090929958 \times X^2+0.147730555 \times X+0.0180485763;$$

where X=said flattening ratio.

9. The coil spring of claim 1, wherein the coil has a total number (Y) of coil turns as follows:

$$Y=-0.0000065161 \times X^4+0.0004455905 \times X^3-0.0110490116 \times X^2+0.1189494097 \times X+0.4928257777;$$

where X=said flattening ratio.

10. A coil spring comprising:
a spring wire having a shape in cross section at any point along an entire length of the spring wire wherein the cross section is circular along first and second opposing arc portions of the cross section and is flat along third and fourth opposing arc portions of the cross section, wherein the circular shape of said cross section has a diameter (W), wherein the third arc portion is at an angle (θ) relative to the fourth arc portion of said cross section, wherein there is a distance (T) between the third arc portion and fourth arc portion of said cross section where the third arc portion is farthest from the fourth arc portion, and wherein the third arc portion forms a first contact face along the length of the spring wire and the fourth arc portion forms a second contact face along the length of the spring wire, wherein 0.32<=a ratio of said distance (T) to said diameter (W)<=0.83, and wherein said ratio T/W is constant along the length of the spring wire;
wherein the spring wire is wound as a coil having coil turns adjacent to each other in a coil axis direction that are stabilized by contact between the third contact face and fourth contact face;
wherein a stress ratio of the coil is fixed to be no more than a stress ratio of a same coil having a circular cross section without any flat arc portions along a length of said same coil;
wherein the coil formed by said spring wire has a fixed coil diameter, a fixed spring constant, and said fixed stress ratio;
wherein said ratio T/W represents a flattening for which the stress ratio of the coil is equal to or lower than a stress ratio that would occur for said coil under circumstances in which the spring wire had a circular shaped cross section; and
wherein the coil has a total number of coil turns that is determined according to the flattening of the spring wire cross section in a region below a line of a relationship, the relationship appearing in a state where the coil inner diameter, spring constant, and stress ratio are fixed, the region below the line of the relationship defined so that the flattening in said region is less than the flattening on the line for each coil turn.

11. The coil spring of claim 10, wherein the coil has a total number (Y) of coil turns predetermined as a function of the ratio of said spring wire cross section distance (T) divided by said spring wire cross section diameter (W), said function being a prescribed fourth order polynomial.

12. The coil spring of claim 10, wherein the coil has a total number (Y) of coil turns as follows:

$$Y=-0.0000023837 \times X^4+0.0002456386 \times X^3-0.0090929958 \times X^2+0.147730555 \times X+0.0180485763;$$

where X=said spring wire cross section distance (T) divided by said spring wire cross section diameter (W).

13. The coil spring of claim 10, wherein the coil has a total number (Y) of coil turns as follows:

$$Y=-0.0000065161 \times X^4+0.0004455905 \times X^3-0.0110490116 \times X^2+0.1189494097 \times X+0.4928257777;$$

where X=said spring wire cross section distance (T) divided by said spring wire cross section diameter (W).

* * * * *